Figure 1:
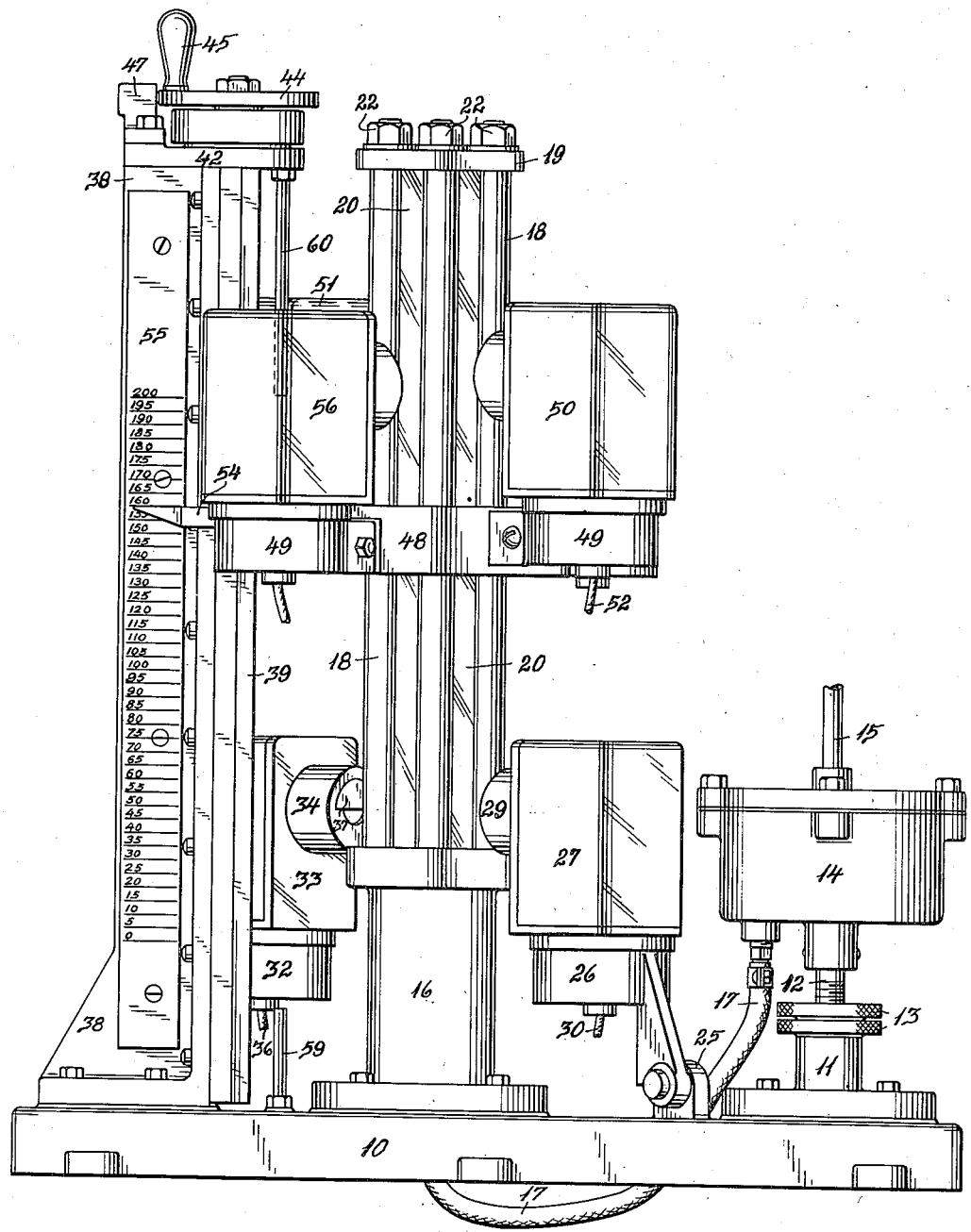

April 16, 1940.　　　A. L. COOPER　　　2,197,205
PRESSURE RESPONSIVE CONTROL MEANS
Filed Dec. 13, 1937　　　3 Sheets-Sheet 1

Inventor
A. L. Cooper.
By Homer F. Sweet.
Attorney

April 16, 1940.　　　　　A. L. COOPER　　　　　2,197,205

PRESSURE RESPONSIVE CONTROL MEANS

Filed Dec. 13, 1937　　　3 Sheets-Sheet 2

Inventor
A. L. Cooper.
By Homer G. Sweet.
Attorney

April 16, 1940.  A. L. COOPER  2,197,205

PRESSURE RESPONSIVE CONTROL MEANS

Filed Dec. 13, 1937  3 Sheets-Sheet 3

Inventor
A. L. Cooper.
By Howek G Sweet
Attorney

Patented Apr. 16, 1940

2,197,205

UNITED STATES PATENT OFFICE 2,197,205

PRESSURE-RESPONSIVE CONTROL MEANS

Albert L. Cooper, Colorado Springs, Colo., assignor to Holly Sugar Corporation, Colorado Springs, Colo., a corporation of New York Application December 13, 1937, Serial No. 179,550

4 Claims. (Cl. 250—41.5)

This invention relates to pressure-responsive control means, and has as an object to provide an improved arrangement and assembly of elements adapted to control and actuate apparatus at certain limits of pressure variations acting upon the control means.

A further object of the invention is to provide an improved arrangement and assembly of elements constituting pressure-responsive control means for the regulation and actuation of apparatus at certain limits of pressure variations.

A further object of the invention is to provide an improved arrangement and assembly of elements responsive to pressure variations and automatically operable at certain limits of such variations to actuate apparatus operatively associated therewith.

A further object of the invention is to provide improved pressure-responsive control means adjustable to automatically react at various limits of pressure variations for the actuation of associated apparatus.

A further object of the invention is to provide improved pressure-responsive control means automatically operable at certain limits of an altitudinally-variable, pressure-balanced column to actuate, regulate and control associated apparatus.

A further object of the invention is to provide improved pressure-responsive control means automatically operable through the interruption of light paths by an altitudinally-variable, pressure-balanced column to automatically actuate, regulate and control associated apparatus.

A further object of the invention is to provide improved pressure-responsive control means wherein an altitudinally-variable, pressure-balanced column in intercepting relation with adjustably-associated light paths is employed to automatically actuate and control associated apparatus at certain limits of the column variation.

A further object of the invention is to provide improved pressure-responsive control means that is positive, efficient, and precise in operation, simple and durable, readily adjustable throughout a relatively wide range of effective operation, and which is adaptable to and for automatic control of a wide variety of specific mechanical assemblies and apparatus.

My invention consists in the construction, arrangement and combination of elements hereinafter set forth, pointed out in my claims, and illustrated by the accompanying drawings, in which—

Figures 2, 3:
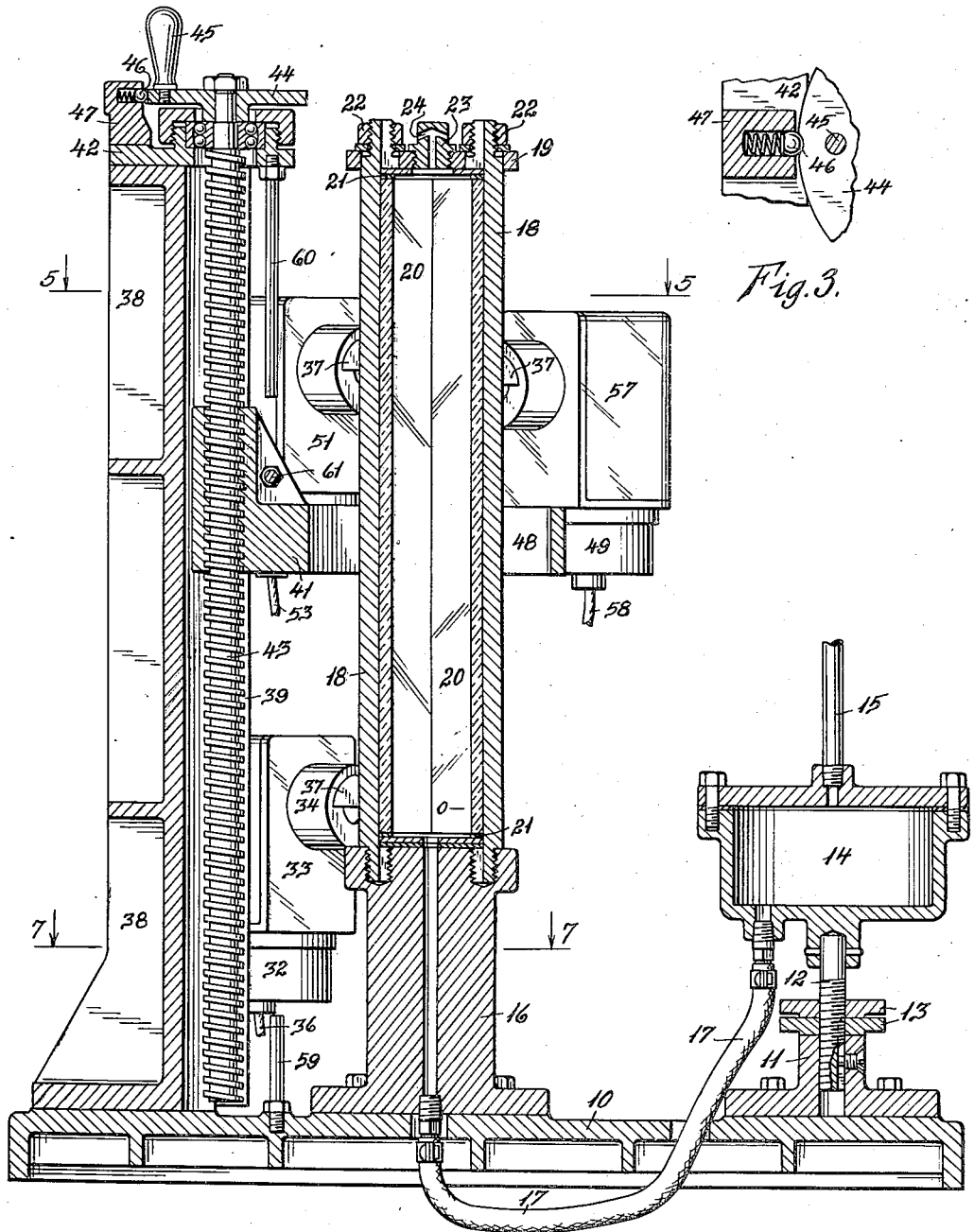
Figure 4:
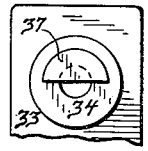
Figures 5, 6:
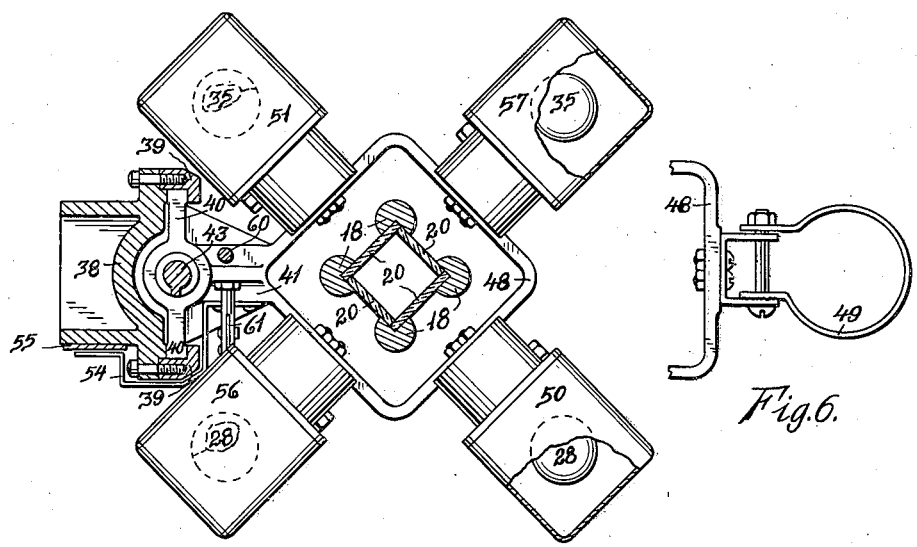
Figures 7, 8:
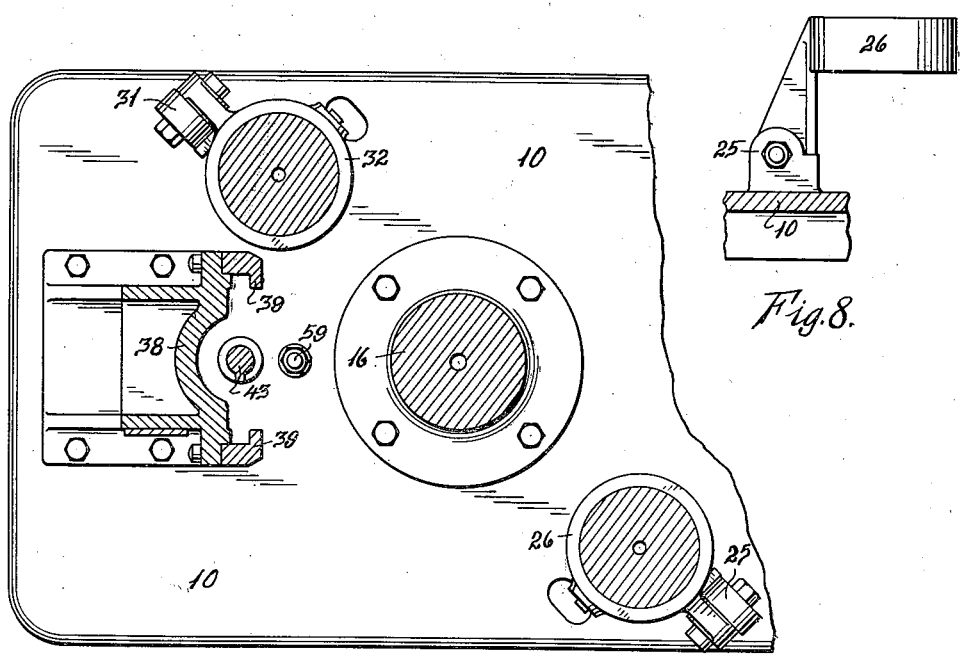

Figure 1 is a side elevation of a preferred unitary assembly embodying the principles of my invention. Figure 2 is a vertical section axially through the assembly shown in Figure 1. Figure 3 is a fragmentary, detail view, partly in section, of latching and positioning means employed with an adjustable element of the assembly. Figure 4 is a fragmentary, detail elevation of housing and shield means for a light-sensitive element incorporated with the assembly. Figure 5 is a section taken on the indicated line 5—5 of Figure 2. Figure 6 is a fragmentary, detail plan of an adjustable mounting advantageously employed with the invention. Figure 7 is a cross section taken on the indicated line 7—7 of Figure 2, certain elements of the assembly being broken away to conserve space. Figure 8 is a side elevation of another type of adjustable mounting advantageously employed with the invention.

In the construction of the improvement as shown, the elements of the assembly are illustrated as grouped in operative interrelation on a suitable base 10 formed of any suitable material, such as metal, in any desired manner, and arranged to be supported on and in fixed relation with a suitable horizontal element. Adjacent one end of the base 10, a suitable apertured fitting 11 slidingly supports and vertically positions a threaded post 12 wherewith are threadedly engaged a pair of adjusting nuts 13 arranged to bear against the upper end of the fitting 11 for altitudinal adjustment of the post 12 relative to said fitting. A pressure chamber in the form of a closed cup 14 is carried by and in fixed relation on the upper end of the post 12 for altitudinal adjustment with said post, and communicates through a suitable pressure line or pipe 15 seated in the top of said chamber with a source or supply of fluid under pressure variations deriving from other apparatus, not shown, said chamber 14 being sealed from the atmosphere, except as hereinafter specified, so that the pressure acting within said chamber is at all times the same as that transmitted thereto through the line 15.

Substantially centrally of the base 10, a standard 16 is fixed to and rises from said base in spaced, adjacent relation with the chamber 14 and its supporting elements, and an axial bore in the standard 16 communicates through a suitable flexible conduit 17 with the pressure chamber 14, one end of the conduit 17 being seated in the lower end of the standard 16 for registration with the bore of said standard and the other end of said conduit engaging through the bottom of the chamber 14, so that pressures obtaining within said chamber are transmitted through said conduit and standard to a column assembly supported by the latter. The column assembly illustrated comprises four identical posts 18 fixed at their lower ends to the upper end of the standard 16 and rising therefrom in uniformly-spaced, parallel relation to engagement of their upper ends through a cap plate 19. The posts 18 are so disposed as to define the corners of a square and each of said posts is provided with a ninety degree notch or groove extending throughout its length, said grooves being related one to the other so as to provide seats for plane glass plates 20 marginally engaging each other within said grooves to form an elongated transparent column of square cross section. The plates 20 are marginally sealed one to the other in any suitable or desired manner and bear at their opposite ends against suitable gaskets 21 adjacent the end of the standard 16 and the cap plate 19 so that pressure applied to the cap plate 19 by means of nuts 22 threadedly engaging the upper ends of the posts 18 acts to firmly seat the plates 20 against said gaskets and seal the column formed by said plates against escape of fluids or pressures therefrom. The cap plate 19 is provided with a central fitting 23 wherethrough suitable channels 24 communicate between the interior of the column just described and the exterior atmosphere, the lower end of said column communicating freely with the upper end of the bore in the standard 16, so that pressures transmitted through the line 15, chamber 14, conduit 17 and bore of the standard 16 are conveyed to said column and balanced therein against atmospheric pressure through the channels 24. The chamber 14 acts as a reservoir for mercury, or similar heavy liquid, which naturally flows from said chamber to fill the conduit 17 and bore of the standard 16 and enters the column defined by the plates 20 to a height determined by the pressure acting through the line 15 on the surface of the liquid within the pressure chamber. When only atmospheric pressure is present in the line 15, it is obvious that the liquid in said chamber and in the column formed by the plates 20 will stand at the same level, and that altitudinal adjustment of the chamber 14 by means of the nuts 13 will serve to vary the height of the liquid within the column, said nuts being provided and employed to adjust the height of the column liquid to coincidence with a zero mark or calibration adjacent the lower end of the column when only atmospheric pressures are present in the line 15. Further, it should be apparent that the arrangement shown and described provides for an increase in the column liquid height when pressures greater than atmospheric are transmitted through the line 15 to the chamber 14, such increases in the column liquid height being directly proportional to the increase above atmospheric of the pressures through the line 15 acting on the surface of the liquid in the chamber 14.

Hingedly mounted to swing in a vertical arc toward and away from the standard 16 on a lug 25 rising from the base 10 adjacent the fixture 11, a mounting bracket 26 is arranged to position and removably support a housing 27 enclosing a suitable light source, such as an electric bulb 28. The housing 27 is formed with a light-directing hood 29 arranged to concentrate the light from the bulb 28 toward and against one of the plates 20 adjacent the bottom of the column assembly, and the hinge mounting of the bracket 26 on the lug 25 is so arranged as to limit the range of movement of said bracket in one direction to a position such as will locate the axis of the hood 29 in perpendicular relation with the adjacent plate 20 of the column assembly and in substantial coincidence with the zero calibration of said assembly, while permitting the said bracket 26 and housing 27 carried thereby to be swung outwardly, at times, and away from the column assembly. The light source 28 is included in a suitable electric circuit, indicated at 30, and is arranged to be continuously illuminated during operation of the control means and apparatus associated therewith. On the opposite side of the standard 16 from the light source just described, a lug 31 rising from the base 10 supports a mounting bracket 32 wherein is removably carried a housing 33 formed with a hood 34 directed toward the column assembly, the construction and arrangement of the lug and bracket elements 31 and 32 being substantially identical with that of the lug 25 and bracket 26, so that the housing 33 is normally positioned with its hood element 34 axially aligned with and on the opposite side of the column assembly from the hood 29 of the housing 27, thus permitting light emanations from the source 28 through the hood 29 to traverse the transparent portion of the column assembly adjacent the zero calibration thereon and enter the hood 34 of the housing 33 when said column is unobstructed. The mounting of the bracket 32 permits the housing 33 to be swung away from the column assembly, at times, in the same manner as above described for the housing 27. The housing 33 operatively mounts and encloses a light-sensitive element 35, such as a photoelectric or selenium cell, which element is operatively included in an electric circuit, indicated at 36, which includes elements of the apparatus to be controlled or actuated, the element 35 operating in the presence of light impinging thereon to close the circuit 36 to such apparatus and to open said circuit in the absence of light of intensity sufficient to actuate said element. For precision in the functioning of the element 35, the light aperture of the hood 34 is preferably masked, as at 37, to obstruct that portion of the aperture above the horizontal plane defined by the zero calibration of the column assembly, in which case any rise of the mercury or other fluid within the column above the zero calibration will immediately obstruct the light path from the source 28 to the element 35 and thus automatically open the circuit 36 controlled by said element. With the arrangement shown and thus far described, it is apparent that when the chamber 14 is altitudinally adjusted to bring the liquid to the zero calibration of the column assembly and only atmospheric pressure is present in the line 15, light from the source 28 may and will traverse the column assembly at the zero calibration to energize the element 35 and close the circuit 36, and that as soon as pressures greater than atmospheric are received within the chamber 14, the liquid in the column assembly will rise to intercept the light rays from the source 28 impinging upon the element 35 and permit opening of the circuit 36, thus affording means responsive to a lower pressure limit for automatically closing a circuit at such lower pressure limit and for automatically opening such circuit at pressures above such limit.

To adjustably mount and position means automatically responsive to relatively higher pressures acting through the line 15, a standard 38 is fixed to the base 10 and rises therefrom in spaced parallel relation with the column assembly, said standard being provided with marginal guide flanges 39 on that face adjacent the column assembly and so disposed as to form a T-slot wherein are slidingly received the arms 40 of a bracket carrier assembly 41. The upper end of the standard 38 supports a fixed head 42 wherein is rotatably supported one end of a feed screw 43 positioned in depending relation with said head between the guide flanges 39 and in intersecting relation with the head portion of the carrier assembly 41, said latter assembly being formed with a threaded bore in its head portion aligned with and adapted for threaded engagement by the screw 43, whereby rotation of said screw acts to raise or lower the assembly 41 along and in its guided relation with the standard 38. The stem of the screw 43 is extended above the head 42 and fixedly engages with a crank disc 44 whereon is mounted an actuating handle 45 for convenience in rotating the screw 43, the periphery of the crank disc 44 preferably being formed with suitably spaced notches wherein a spring-backed detent 46 seated in a boss 47 rising from the head 42 may engage to yieldably latch and position said disc and consequently the screw 43 at that degree of rotation corresponding with the desired altitudinal adjustment of the carrier assembly 41.

The carrier assembly 41 is provided with a yoke or loop 48 disposed in a plane perpendicular to and in surrounding relation with the column assembly, which yoke or loop supports mounting brackets 49 extending outwardly therefrom on opposite sides of the column assembly to support and removably position hooded housings 50 and 51 identical with and respectively aligned above the housings 27 and 33. The housing 50 encloses a light source 28 operatively associated with an electric circuit 52, which may be a branch of the circuit 30, and arranged for the projection of light rays through parallel plates 20 of the column assembly for impingement upon and energization of a light-sensitive element 35 within the housing 51, said latter housing preferably being provided with a mask 37 obstructing the upper portion of its light aperture in like manner and for the same purpose as recited in connection with the housing 33 and hood 34. The element 35 of the housing 51 is connected in and for opening and closing of an electric circuit 53 which may connect for opposite actuation thereof with the same apparatus elements served by the circuit 36, or which may lead to and for control of separate apparatus elements, as a specific adaptation of the control means may require. With the arrangement just described, it is obvious that light emanations from the source within the housing 50 may and will traverse the transparent column assembly to impinge on and energize the element 35 of the housing 51 so long as the liquid within the column is below that horizontal plane defined by the lower margin of the mask 37 associated with the housing 51, thus maintaining the circuit 53 closed relative to the apparatus served thereby, and that when pressure through the line 15 is sufficient to raise the liquid column into obstructing relation between the light source and light-sensitive element of the housings 50 and 51, said light-sensitive element becomes deenergized to open the circuit 53 and thereby initiate, reverse, or arrest actuation of the elements served by said circuit. Due to the mounting of the carrier assembly on the feed screw 43, the plane at which energization or deenergization of the element 35 within the housing 51 occurs may be readily adjusted altitudinally of the column assembly so that alteration of the condition obtaining in the circuit 53 may automatically be had at that level corresponding with any selected pressure through the line 15.

For convenience in adjusting the carrier assembly altitudinally of the column assembly, an indicator 54 is rigidly associated with said carrier assembly in closely overlying relation with a scale or gauge 55 mounted on one side margin of the standard 38, said scale or gauge being calibrated and provided with indicia relating in convenient form or terms to the variables which produce or are affected by the pressure variations acting through the line 15.

Since, in certain installations, it may be expedient or desirable to modify the operation of the apparatus controlled by the instant invention prior to a complete arresting or reversal of the apparatus operation, the control means is shown as provided with a supplementary pair of housings 56 and 57, enclosing, respectively, a light source 28 and a light-sensitive element 35, identical with the housings 50 and 51, respectively, and carried in brackets 49 on the yoke or loop 48 in light-traversing alignment relative to the column assembly perpendicular to and at a level beneath that of the housings 50 and 51, so that, as the liquid is pressure-lifted altitudinally of the column it first obstructs the light rays acting on the element of the housing 57 for modification of apparatus functioning through the circuit 58 controlled by said element, and later obstructs the light path to the element 35 of the housing 51.

To limit travel of the carrier assembly 41 to its operative range altitudinally of the column assembly, suitable stops 59 and 60 may be fixed to the base 10 and head 42, respectively, for limiting engagement against opposite sides of said carrier. Further, the carrier assembly may be provided with a fixed pin 61 directly and continuously linked with suitable constant recording apparatus in such manner as to constantly register on the recording apparatus the relative position of the carrier assembly altitudinally of the column assembly, thus providing a record of the maximum pressures with which the control means has been variously adjusted to function.

In the practical use of the control means illustrated and described, the liquid column of the improvement may be balanced against heads of liquid, boiler pressures, gas receiver pressures, compressors, and the like, as is common and well known practice, and operatively connected with suitable apparatus for actuation and control of the latter through the electrical circuits of the improvement at and between specific pressure limits as determined by the setting of the apparatus, the improved control means being fully automatic in operation and susceptible of ready adaptation for the control of any apparatus or installation wherewith electrical actuating means may function.

Since many changes, variations and modifications in the specific form, construction and arrangement of the elements shown and described may be had without departing from the spirit of the invention, and may in fact be desirable or necessary in adapting the invention for use with specific apparatus and installations, I wish to be understood as being limited solely by the scope of the appended claims rather than by any de-

I claim as my invention—

1. Pressure-responsive control means comprising a pressure chamber charged with a supply of liquid, a pressure line operatively communicating between a source of pressure variations and the portion of said chamber above the level of liquid therein, a hollow, transparent standard having a passage of cross-sectional area much less than that of the chamber interior vertically disposed adjacent said chamber, a flexible conduit communicating between the lower portion of said chamber and the base of said standard for free flow of liquid therebetween, whereby pressures acting on the liquid in said chamber are productive of altitudinal variations in the liquid column in said standard proportional to said pressures and greater than the corresponding liquid-level variations in said chamber, a control circuit fixedly associated with said standard for actuation by the liquid column therein at a predetermined lower limit of its range of altitudinal variation, means for varying and adjusting the altitudinal position of said chamber to bring the liquid level in said standard to said predetermined lower limit at atmospheric pressure, and a second control circuit manually adjustable altitudinally of said standard for actuation by said liquid column at an upper limit of its range of altitudinal variation.

2. Pressure-responsive control means comprising a pressure chamber charged with a supply of liquid, a pressure line operatively communicating between a source of pressure variations and the portion of said chamber above the level of liquid therein, a hollow, transparent standard having a passage of cross-sectional area much less than that of the chamber interior vertically disposed adjacent the chamber, a flexible conduit communicating between the lower portion of said chamber and the base of said standard for free flow of liquid therebetween, whereby pressures acting on the liquid in said chamber are productive of altitudinal variations in the liquid column in said standard proportional to said pressures and greater than the corresponding liquid level variations in said chamber, a light source and a light-sensitive element fixedly disposed on opposite sides of said standard and cooperable to form a control circuit disposed for actuation by the liquid column in said standard at a predetermined lower limit of its range of altitudinal variation, means for varying and adjusting the altitudinal position of said chamber to bring the liquid level in said standard to said predetermined lower limit at atmospheric pressure, a carrier surrounding and manually adjustable altitudinally of said standard, and a second control circuit fixed to said carrier for actuation by said liquid column in the upper reaches of its range of altitudinal variation.

3. Pressure-responsive control means comprising a pressure chamber charged with a supply of liquid, a pressure line operatively communicating between a source of pressure variations and the portion of said chamber above the level of liquid therein, a hollow, transparent standard having a passage of cross-sectional area much less than that of the chamber interior vertically disposed adjacent the chamber, a flexible conduit communicating between the lower portion of said chamber and the base of said standard for free flow of liquid therebetween, whereby pressures acting on the liquid in said chamber are productive of altitudinal variations in the liquid column in said standard proportional to said pressures and greater than the corresponding liquid level variations in said chamber, a light source and a light-sensitive element fixedly disposed on opposite sides of said standard and cooperable to form a control circuit disposed for actuation by the liquid column in said standard at a predetermined lower limit of its range of altitudinal variation, means for varying and adjusting the altitudinal position of said chamber to bring the liquid level in said standard to said predetermined lower limit at atmospheric pressure, a carrier surrounding and manually adjustable altitudinally of said standard, and a pair of angularly-related, independent, control circuits fixed to said carrier in altitudinally-spaced relation for closely successive actuation by said liquid column in the upper reaches of its range of altitudinal variation.

4. In apparatus of the character described, a hollow, vertically-disposed standard formed with transparent, angularly-related, plane walls, a pressure chamber having an interior diameter considerably greater than the cross-sectional area of said standard disposed adjacent the latter, a flexible conduit communicating between the lower portion of said chamber and the base of said standard, a supply of liquid in said chamber, conduit, and standard, manually-adjustable means supporting said chamber for altitudinal variation of its position to bring the liquid level in said standard to a predetermined lower limit at atmospheric pressure, a pressure line operatively communicating between a source of pressure variations and the portion of said chamber above the level of liquid therein, whereby pressures acting through said line on the liquid in said chamber are productive of altitudinal variations in the liquid column of said standard proportional to said pressures and greater than the corresponding liquid-level variations in said chamber, a light source and a light-sensitive element fixed on opposite sides of said standard and cooperable to establish a control circuit at the predetermined lower limit of liquid column variation and actuatable by said liquid column, and a pair of similar control circuits fixed in altitudinally-spaced, perpendicular relation for simultaneous adjustment altitudinally of said standard and successively actuatable by said liquid column in the upper reaches of its range of altitudinal variation.

ALBERT L. COOPER.